Figure 1:
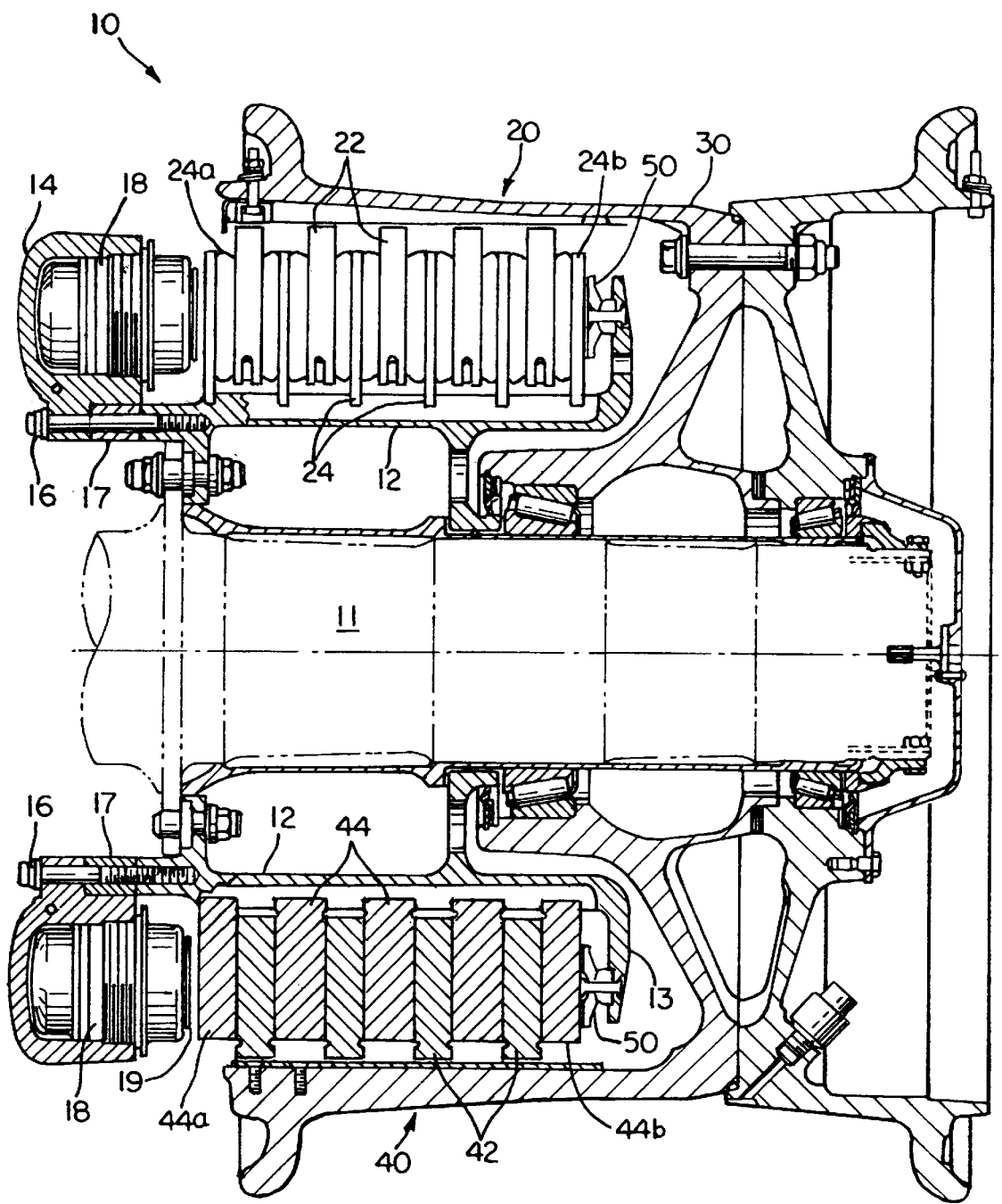

United States Patent [19]
Niespodziany et al.

[11] Patent Number: 6,119,817
[45] Date of Patent: *Sep. 19, 2000

[54] METHOD OF CONVERTING AN AIRCRAFT BRAKE ASSEMBLY

[75] Inventors: David A. Niespodziany, South Bend; Stanley W. May, Mishawaka, both of Ind.; Esaw Harris, Cassopolis, Mich.; Sean W. Linden, Granger, Ind.

[73] Assignee: AlliedSignal Inc., Morristown, N.J.

[ * ] Notice: This patent is subject to a terminal disclaimer.

[21] Appl. No.: 09/335,243

[22] Filed: Jun. 17, 1999

Related U.S. Application Data

[63] Continuation-in-part of application No. 08/870,923, Jun. 6, 1997, Pat. No. 5,926,932.

[51] Int. Cl.[7] .................................................. F16D 63/00
[52] U.S. Cl. ............... 188/18 A; 29/401.1; 188/71.1; 188/71.4; 188/71.5; 188/71.6
[58] Field of Search .................... 29/401.1; 188/71.5, 188/71.1, 71.4, 71.6, 18 A

[56] References Cited

U.S. PATENT DOCUMENTS

| | | | |
|---|---|---|---|
| 3,887,041 | 6/1975 | Malone | 188/71.5 |
| 5,107,968 | 4/1992 | Delpassand | 188/264 |
| 5,205,382 | 4/1993 | Edmisten | 188/71.5 |
| 5,255,761 | 10/1993 | Zaremsky | 188/71.5 |
| 5,321,876 | 6/1994 | Massing et al. | 29/401.1 |
| 5,485,898 | 1/1996 | Patko | 188/71.5 |
| 5,540,305 | 7/1996 | Hammond | 188/71.5 |

FOREIGN PATENT DOCUMENTS

| | | | |
|---|---|---|---|
| 0716244 | 6/1996 | European Pat. Off. | F16D 55/40 |
| 0 840 029A1 | 5/1998 | European Pat. Off. | F16D 55/36 |

*Primary Examiner*—David P. Bryant
*Assistant Examiner*—John C. Hong
*Attorney, Agent, or Firm*—Larry J. Palguta

[57] ABSTRACT

A convertible aircraft brake assembly (10) designed as original equipment to have heat sinks comprising a steel heat sink (20) aircraft brake assembly and a carbon-carbon composite heat sink (40) aircraft brake assembly. When the aircraft brake assembly is converted from one type of heat sink to the other, the conversion is accomplished with minimal changes in component parts. The conversion can be accomplished without any changes in the piston housing (14), torque tube (12), and wheel (30) because the heat sinks include therein respective components which enable each heat sink to be utilized with the commonly used piston housing (14), torque tube (12), and wheel (30).

22 Claims, 1 Drawing Sheet

METHOD OF CONVERTING AN AIRCRAFT BRAKE ASSEMBLY

This is a continuation-in-part of U.S. patent application Ser. No. 08/870,923 filed Jun. 6, 1997. Now U.S. Pat. No. 5,926,932.

The present invention relates generally to aircraft brakes, and in particular to aircraft brake assemblies that are convertible from a first type of heat sink to a second type of heat sink.

Steel heat sink aircraft brake assemblies have proven to be economical, reliable, and desirable for aircraft that fly relatively short distances. Steel heat sink aircraft brake assemblies are still state of the art in the aerospace industry. Such brake assemblies typically include either steel rotor or stator disks and a corresponding plurality of friction material rotor or stator disks. Carbon-carbon composite heat sink aircraft brake assemblies are increasing in their usage as the size of commercial aircraft and their flying distance has increased. As disclosed in co-owned Massing et al. U.S. Pat. No. 5,321,876, commercial aircraft flying long distances or long hauls may increase revenue and/or reduce operating costs by utilizing the significant weight benefits offered by a carbon-carbon composite heat sink as compared to a generally heavier steel heat sink. However, if an aircraft with carbon-carbon composite heat sinks is scheduled to fly a short haul, the use of such heat sinks may not be cost effective. Massing et al. U.S. Pat. No. 5,321,876 discloses a method of converting aircraft brake assemblies from a first heat sink to a second heat sink, wherein different piston bushing assemblies, backing plate connectors and heat shields are utilized for the respective heat sinks. It is highly desirable that an aircraft brake assembly suitable for utilization of either a carbon-carbon composite heat sink or a steel heat sink can be easily converted from one heat sink to the other. It is an object of the present invention to simplify the method of converting aircraft brake assemblies, and thus avoid the distinct disadvantages of converting or retrofitting an existing brake assembly from a carbon-carbon composite heat sink to a steel heat sink which could result in a heavier steel aircraft brake assembly than a brake assembly designed originally to be only a steel aircraft brake assembly. With the present invention, an airline would be able to utilize a method for converting the aircraft brake assembly and thus can order a group or fleet of aircraft suitable for long and short hauls, with the long haul aircraft utilizing a carbon-carbon composite heat sink brake assembly while the short haul aircraft utilize a steel heat sink aircraft brake assembly. Other reasons for converting may include airline maintenance cost and capabilities, fluctuating fuel costs or flight weight limitations. Also, should changes in aircraft scheduling occur, the particular type of heat sink utilized in the brake assemblies can be converted easily to a different type of heat sink. It is highly desirable that convertible brake assembly contain common parts in order to reduce the number of parts and inventory, and that corrosion resistance of parts be improved to effect the enhanced reliability and useful life of the parts. Also highly desirable is that vibrations in the brake assemblies be minimized to reduce the possibility of damage to parts of the assemblies, and that appropriate thermal barriers be present to prevent or reduce heat transfer. Finally, it is highly desirable that the convertible brake assembly of the present invention have the capability of being changed to a different convertible brake assembly, such as one or more of the convertible brake assemblies disclosed in copending U.S. Pat. No. 5,926,932, in order to offer the aircraft operator the advantages described above for carbon-carbon and steel aircraft brake assemblies. The present invention provides solutions to the above problems by providing an aircraft brake assembly designed as original equipment to be convertible from a first heat sink of one of carbon and steel brake assemblies to a second heat sink of the other of carbon and steel brake assemblies, the aircraft brake assembly for connection with a surrounding wheel via rotor disks of the respective heat sink, each heat sink including a pressure plate disk, rotor disks, stator disks, and a backing plate disk, the brake assembly comprising the first heat sink, a torque tube connected with the stator disks of the first heat sink and including a backing plate with pad means for engaging the backing plate disk, a piston housing connected by means for connecting with the torque tube, and a spacer member, the piston housing having a plurality of pistons located a distance from the pressure plate disk, the first heat sink having an overall axial length substantially filling an axial space between the pistons and pad means, the brake assembly enabling:

disassembly of the piston housing, torque tube, connecting means, spacer member, and first heat sink, and assembly of the second heat sink, torque tube, piston housing, connecting means, and spacer member wherein the second heat sink substantially fills said axial space and positions the pressure plate disk of the second heat sink at substantially said distance from the pistons.

The invention is described in detail below with references to the drawing which illustrates an embodiment in which:

FIG. 1 is an illustration of an aircraft brake assembly convertible by means of stator disks of the steel heat sink having an enlarged axial length compared to the axial length of a typical steel heat sink.

FIG. 1 illustrates an aircraft brake assembly with different first and second heat sinks shown in the top and bottom portions of the drawing only for illustrative purposes. In the upper portion of the drawing of the preferred embodiment of a convertible brake assembly, the aircraft brake assembly 10 includes a torque tube 12 attached to a piston housing 14 by a plurality of bolts 16. The piston housing 14 is attached to the torque tube 12 by means of the bolts 16 which comprise connection means and an intermediate annular spacer member, intermediate member, or ring 17. Piston housing 14 includes a plurality of piston bushing assemblies 18 with pistons 19. The steel heat sink designated generally by reference numeral 20 includes a plurality of steel rotor disks 22 that engage, via spline and slot engagements, the surrounding wheel 30, as is well known in the art, and a plurality of friction material disks 24 engaging the torque tube 12 via the well known spline and slot engagement. It should be clearly understood that the rotors and stators can, as is well known in the art, be reversed such that the rotors which are keyed to the wheel have friction material thereon, while the stators which are keyed to the torque tube are essentially steel plates for engagement with the friction material of the rotors. Thus, each steel brake embodiment disclosed herein can comprise either one of these well-known constructions (eg. friction material linings on either the stators or rotors).

Steel heat sink 20 includes stator disks 24 each having an increased axial width or length as compared to the corresponding axial width or length of stators in a typical steel heat sink. Thus, by increasing the axial length or width of the stator disks, the pressure plate disk 24a, interchangeable with the backing plate disk 24b, is positioned at a predetermined separation distance from the plurality of pistons 19.

The rotor disks 22 can also have a slightly increased axial width or thickness, if desired. Because the rotors experience only a fraction of the wear experienced by the friction material linings of the stator disks, the rotor disks would have very little increase in thickness.

In order to convert the brake assembly 10 from one having the steel heat sink 20 to a carbon-carbon composite heat sink designated by reference numeral 40 in the lower part of the drawing, the brake assembly 10 is disassembled wherein the piston housing 14, bolts 16, ring 17, torque tube 12 and heat sink 20, once removed from the axle 11, are disconnected from one another. The carbon-carbon composite heat sink 40, which comprises a plurality of rotor disks 42 and stator disks 44, is assembled on the torque tube as shown in the lower portion of the drawing, such that the backing plate stator disk 44b contacts the pad 50. The pad 50 is a typical swivel pad utilized with carbon-carbon composite disks, but which in brake 10 is also utilized to engage the backing plate disk 24b of steel heat sink 20. As can be readily seen in FIG. 1, the spacer member 17 positions the piston housing 14 at a distance further away from the backing plate 13 of the torque tube 12, thus accommodating both the carbon-carbon composite heat sink 40 and the longer length steel heat sink 20 (longer compared to a typical axial length steel heat sink). In some brake assemblies, backing plate 13 is bolted onto torque tube 12 instead of being integral with the torque tube. Spacer 17 can also be placed between such a backing plate 13 and torque tube to accommodate in like manner a longer heat sink and positioning of the backing plate 13 further away from pistons 19. Such a construction is within the scope of the present invention. Thus, brake assembly 10 is converted from a steel heat sink 20 to a carbon-carbon composite heat sink 40 by disassemblying the steel heat sink convertible brake assembly, removing the steel heat sink 20 and replacing it with the carbon-carbon heat sink 40, and assemblying the carbon heat sink convertible brake assembly. The spacer member or ring 17 is utilized in both of the steel and carbon heat sink brake assemblies and effects several improvements in the convertible brake assembly 10. Ring 17 is made of 4340 carbon steel and is diffused nickel cadmium plated. The benefit of such a ring is that the ring provides a corrosion resistant barrier between the aluminum piston housing 14 and the inherently corrosive steel torque tube. Typically, the torque tube has a heat resistant paint which eventually wears off or is stripped off during overhaul. Also, this will combat gauling of the piston housing interface surface (which normally engages the torque tube interface surface) that could occur, in the absence of a ring, after the torque tube 12 starts to rust during use of the aircraft. The ring 17 provides additional dampening which reduces brake vibrations transmitted into the piston housing. The piston bushing assemblies 18 contain many precision parts which need to be protected from damage by brake vibrations. Ring 17 provides thermal protection benefits. Heat transfer from torque tube 12 to piston housing 14 is reduced by ring 17, thus reducing hydraulic fluid temperatures. Some aircraft brake assembly specifications have very stringent maximum hydraulic temperature requirements. The present convertible brake assembly 10 can be considered a cool (low temperature) operating brake in comparison to other nonconvertible brake assemblies. Finally, the convertible brake assembly provides the flexibility of being able to reduce the heat sink envelope by simply removing the ring and upon reassembly of the brake inserting a reduced axial length and lighter heat sink, while maintaining usable rejected take-off piston stroke for the shorter axial length heat sink. The shorter axial length heat sink may be either the steel heat sink or the carbon heat sink, or both. Of course, the ring 17 may also be used with the carbon heat sink and removed for the insertion of a shorter length steel heat as disclosed in copending U.S. patent application Ser. No. 08/870,923.

The same piston bushing assemblies 18 are used with each heat sink 20 and 40. The brake assembly utilizes the pad backing plate means 50 with both heat sinks, rather than utilizing a friction material disk attached directly to the backing plate 13 of torque tube 12 as is typical in a steel heat sink brake (friction material backing plate disks are typically riveted to the backing plate 13 in steel heat sinks). Thus, the pad means is used with both heat sinks, and the pressure plate/backing plate disks 24a/24b and 44a/44b are interchangeable within their respective heat sinks. To convert the brake from one with carbon-carbon composite heat sink 40 to steel heat sink 20, the above steps are simply reversed.

The convertible brake assembly described above and illustrated in the drawings provide a more simply convertible brake which requires minimal changes in component parts. The brake assemblies all utilize, with either a steel heat sink or carbon heat sink, a common swivel pad means 50 which engages adjacent disks, spacers, or plates of both types of heat sinks. Additionally, the correspondingly shaped recesses typically utilized in carbon-carbon composite backing plate disks to receive the pad means are not utilized; the surface of the carbon-carbon composite backing plate disk does not have any recesses and the essentially flat surface engages the plurality of pad means 50. The brake assembly disclosed and illustrated herein has interchangeable pressure plate disks and backing plate disks within the respective heat sinks. This is a substantial advantage in that the number of different part numbers for the brake are reduced, and one part number can be used commonly at two positions within the respective heat sink of a brake assembly. The convertible brake assembly permits an airline to purchase an aircraft which can be utilized for different lengths of flights, with long haul designated aircraft utilizing carbon-carbon composite heat sink brake assemblies which may be more economical for such flights, while the short haul designated aircraft can use steel heat sink aircraft brake assemblies which are economical for short hauls. Other reasons for converting may include airline maintenance cost and capabilities fluctuating fuel costs or flight weight limitations. Should flight scheduling change or the airline decide to change some aircraft from one designated group to another designated group, the particular type of heat sink can be converted easily to the other type of heat sink and enable the airline to optimize operating costs.

What is claimed is:

1. A method of converting an aircraft brake assembly designed as original equipment to be convertible from a first heat sink of a carbon brake assembly to a second heat sink of a steel brake assembly, the aircraft brake assembly for connection with a surrounding wheel via rotor disks of the respective heat sink, each heat sink including a pressure plate disk, rotor disks, stator disks, and a backing plate disk, the brake assembly comprising the first heat sink, a torque tube connected with the stator disks of the first heat sink and including a backing plate with pad means for engaging the backing plate disk, a piston housing connected by means for connecting with the torque tube, and a spacer member, the piston housing having a plurality of pistons located a distance from the pressure plate disk, the first heat sink having an overall axial length substantially filling an axial space between the pistons and pad means, comprising the steps of:

disassembling the piston housing, torque tube, connecting means, spacer member, and first heat sink, and assembling the second heat sink, torque tube, piston housing, connecting means, and spacer member wherein the second heat sink comprises a steel heat sink having friction material on one of the rotor disks and stator disks thereof with the friction material having axial thicknesses such that the second heat sink substantially fills said axial space and positions the pressure plate disk of the second heat sink at substantially said distance from the pistons.

2. The method in accordance with claim 1, wherein the pad means is utilized with both of the first and second heat sinks.

3. The method in accordance with claim 1, wherein the pressure plate disk and backing plate disk are interchangeable within the respective brake assembly.

4. An aircraft brake assembly designed as original equipment to be convertible from a first heat sink of a carbon brake assembly to a second heat sink of a steel brake assembly, the aircraft brake assembly for connection with a surrounding wheel via rotor disks of the respective heat sink, each heat sink including a pressure plate disk, rotor disks, stator disks, and a backing plate disk, the brake assembly comprising the first heat sink, a torque tube connected with the stator disks of the first heat sink and including a backing plate with pad means for engaging the backing plate disk, a piston housing connected by means for connecting with the torque tube, and a spacer member, the piston housing having a plurality of pistons located a distance from the pressure plate disk, the first heat sink having an overall axial length substantially filling an axial space between the pistons and pad means, the brake assembly enabling:

disassembly of the piston housing, torque tube, connecting means, spacer member, and first heat sink, and assembly of the second heat sink, torque tube, piston housing, connecting means, and spacer member wherein the second heat sink comprises a steel heat sink having friction material on one of the rotor disks and stator disks thereof with the friction material having axial thicknesses such that the second heat sink substantially fills said axial space and positions the pressure plate disk of the second heat sink at substantially said distance from the pistons.

5. The aircraft brake assembly in accordance with claim 4, wherein the pad means is. utilized with both of the first and second heat sinks.

6. The aircraft brake assembly in accordance with claim 4, wherein the pressure plate disk and backing plate disk are interchangeable within the respective brake assembly.

7. A method of converting an aircraft brake assembly designed as original equipment to be convertible from a first heat sink of a steel brake assembly to a second heat sink of a carbon brake assembly, the aircraft brake assembly for connection with a surrounding wheel via rotor disks of the respective heat sink, each heat sink including a pressure plate disk, rotor disks, stator disks, and a backing plate disk, the brake assembly comprising the first heat sink, a torque tube connected with the stator disks of the first heat sink and including a backing plate with pad means for engaging the backing plate disk, a piston housing connected by means for connecting with the torque tube, and a spacer member, the piston housing having a plurality of pistons located a distance from the pressure plate disk, the first heat sink comprising a steel heat sink having friction material on one of the rotor disks and stator disks thereof, and the first heat sink having an overall axial length substantially filling an axial space between the pistons and pad means, comprising the steps of:

disassembling the piston housing, torque tube, connecting means, spacer member, and first heat sink, and assembling the second heat sink, torque tube, piston housing, connecting means, and spacer member wherein the second heat sink comprises a carbon heat sink having an axial length substantially equivalent to the axial length of the steel heat sink and that positions the pressure plate disk of the second heat sink at substantially said distance from the pistons.

8. The method in accordance with claim 7, wherein the pad means is utilized with both of the first and second heat sinks.

9. The method in accordance with claim 7, wherein the pressure plate disk and backing plate disk are interchangeable within the respective brake assembly.

10. An aircraft brake assembly designed as original equipment to be convertible from a first heat sink of a steel brake assembly to a second heat sink a of carbon brake assembly, the aircraft brake assembly for connection with a surrounding wheel via rotor disks of the respective heat sink, each heat sink including a pressure plate disk, rotor disks, stator disks, and a backing plate disk, the brake assembly comprising the first heat sink, a torque tube connected with the stator disks of the first heat sink and including a backing plate with pad means for engaging the backing plate disk, a piston housing connected by means for connecting with the torque tube, and a spacer member, the piston housing having a plurality of pistons located a distance from the pressure plate disk, the first heat sink comprising a steel heat sink having friction material on one of the rotor disks and stator disks thereof, and the first heat sink having an overall axial length substantially filling an axial space between the pistons and pad means, the brake assembly enabling:

disassembly of the piston housing, torque tube, connecting means, spacer member, and first heat sink, and assembly of the second heat sink, torque tube, piston housing, connecting means, and spacer member wherein the second heat sink comprises a carbon heat sink having an axial length substantially equivalent to the axial length of the steel heat sink and that positions the pressure plate disk of the second heat sink at substantially said distance from the pistons.

11. The aircraft brake assembly in accordance with claim 10, wherein the pad means is utilized with both of the first and second heat sinks.

12. The aircraft brake assembly in accordance with claim 10, wherein the pressure plate disk and backing plate disk are interchangeable within the respective brake assembly.

13. A method of converting an aircraft brake assembly designed as original equipment to be convertible from a first heat sink of one of carbon and steel brake assemblies to a second heat sink of the other of carbon and steel brake assemblies, the aircraft brake assembly for connection with a surrounding wheel via rotor disks of the respective heat sink, each heat sink including a pressure plate disk, rotor disks, stator disks, and a backing plate disk, the brake assembly comprising the first heat sink, a torque tube connected with the stator disks of the first heat sink and including a backing plate with pad means for engaging the backing plate disk, a piston housing connected by means for connecting with the torque tube, and a spacer member, the piston housing having a plurality of pistons located a distance from the pressure plate disk, the first heat sink having an overall axial length substantially filling an axial space between the pistons and pad means, comprising the steps of:

disassembling the piston housing, torque tube, connecting means, spacer member, and first heat sink, and assembling the second heat sink, torque tube, piston housing, connecting means, and spacer member wherein the second heat sink substantially fills said axial space and positions the pressure plate disk of the second heat sink at substantially said distance from the pistons.

14. The method in accordance with claim 13, wherein the second heat sink comprises a steel heat sink and includes friction material on one of the rotor disks and stator disks thereof with the friction material having axial thicknesses such that the second heat sink substantially fills said axial space.

15. The method in accordance with claim 13, wherein the second heat sink is a carbon heat sink.

16. The aircraft brake assembly in accordance with claim 13, wherein the pad means is utilized with both of the first and second heat sinks.

17. The aircraft brake assembly in accordance with claim 13, wherein the pressure plate disk and backing plate disk are interchangeable within the respective brake assembly.

18. An aircraft brake assembly designed as original equipment to be convertible from a first heat sink of one of carbon and steel brake assemblies to a second heat sink of the other of carbon and steel brake assemblies, the aircraft brake assembly for connection with a surrounding wheel via rotor disks of the respective heat sink, each heat sink including a pressure plate disk, rotor disks, stator disks, and a backing plate disk, the brake assembly comprising the first heat sink, a torque tube connected with the stator disks of the first heat sink and including a backing plate with pad means for engaging the backing plate disk, a piston housing connected by means for connecting with the torque tube, and a spacer member, the piston housing having a plurality of pistons located a distance from the pressure plate disk, the first heat sink having an overall axial length substantially filling an axial space between the pistons and pad means, the brake assembly enabling:

disassembly of the piston housing, torque tube, connecting means, spacer member, and first heat sink, and assembly of the second heat sink, torque tube, piston housing, connecting means, and spacer member wherein the second heat sink substantially fills said axial space and positions the pressure plate disk of the second heat sink at substantially said distance from the pistons.

19. The aircraft brake assembly in accordance with claim 18, wherein second heat sink comprises a steel heat sink and includes friction material on one of the rotor disks and stator disks thereof with the friction material having axial thicknesses such that the second heat sink substantially fills said axial space.

20. The method in accordance with claim 18, wherein the second heat sink is a carbon heat sink.

21. The aircraft brake assembly in accordance with claim 18, wherein the pad means is utilized with both of the first and second heat sinks.

22. The aircraft brake assembly in accordance with claim 18, wherein the pressure plate disk and backing plate disk are interchangeable within the respective brake assembly.

* * * * *